US005708266A

United States Patent [19]
Soshi et al.

[11] Patent Number: 5,708,266
[45] Date of Patent: Jan. 13, 1998

[54] ROTARY MOTION DETECTOR

[75] Inventors: Isao Soshi, Tokyo; Hidenori Miyamoto, Urayasu; Minoru Kato; Junichi Omi, both of Kawasaki; Tatsuo Amanuma, Ageo; Toshiyuki Nakamura, Tokyo, all of Japan

[73] Assignee: Nikon Corporation, Tokyo, Japan

[21] Appl. No.: 654,784

[22] Filed: May 28, 1996

Related U.S. Application Data

[63] Continuation of Ser. No. 361,368, Dec. 22, 1994, abandoned.

[30] Foreign Application Priority Data

Dec. 22, 1993 [JP] Japan ................................ 5-324390

[51] Int. Cl.$^6$ ........................................................ G01D 5/34
[52] U.S. Cl. ........................................ 250/231.14; 356/375
[58] Field of Search .......................... 250/231.16, 231.13, 250/231.14, 231.15, 237 G; 356/373, 375

[56] References Cited

U.S. PATENT DOCUMENTS

| | | | |
|---|---|---|---|
| 3,983,391 | 9/1976 | Clemons | 250/231.16 |
| 4,623,328 | 11/1986 | Hartranft | 250/231.16 |
| 4,628,200 | 12/1986 | Tinios | 250/231.16 |
| 4,737,635 | 4/1988 | Uchida | 250/231.16 |
| 4,978,847 | 12/1990 | Fukunaga et al. | 250/231.14 |
| 4,983,855 | 1/1991 | Grimes | 250/231.16 |

FOREIGN PATENT DOCUMENTS

| | | |
|---|---|---|
| 3-87716 | 4/1991 | Japan . |
| 4-287008 | 10/1992 | Japan . |
| 5-264879 | 10/1993 | Japan . |

Primary Examiner—Stephone Allen

[57] ABSTRACT

An apparatus to detect the amount and direction of rotary motion for use in a vibration compensation system in an optical camera. An indicator disk is provided around the output shaft of a motor which actuates a compensation lens to compensate for vibrations to the camera. The periphery of the indicator disk is provided with a series of holes. A pair of photodetectors, are arranged on the periphery of the disk so as to detect the holes passing thereunder. The two photodetectors are separated by a distance equal to ¾ of the distance between two holes. By comparing the pattern of signals emitted by the photodetectors the direction of rotation of the indicator disk can be determined. Further, the pulses in the output of either photodetector can be counted to determine the amount of movement. The actual direction and amount of movement as calculated is provided to a vibration compensation circuit as feedback for use in controlling the compensation lens.

6 Claims, 6 Drawing Sheets

| ZONE | Setting F value | Number of pulses | d 1 | d 2 |
|---|---|---|---|---|
|  | Telephoto mechanism end | 225+A | — | — |
| 1 | 102 | 221+A | 3.03558 | 58.248 |
| 2 | 97.5 | 205+A | 2.98276 | 56.7343 |
| 3 | 93 | 189+A | 2.92176 | 55.263 |
| 4 | 88.5 | 173+A | 2.84917 | 53.837 |
| 5 | 84 | 158+A | 2.76671 | 52.4525 |
| 6 | 79.5 | 142+A | 2.67819 | 51.1065 |
| 7 | 75 | 126+A | 2.58582 | 49.7995 |
| 8 | 70.5 | 110+A | 2.49039 | 48.5319 |
| 9 | 66 | 94+A | 2.39114 | 47.3076 |
| 10 | 61.5 | 79+A | 2.28839 | 46.1299 |
| 11 | 57 | 63+A | 2.18350 | 45.001 |
| 12 | 52.5 | 47+A | 2.07951 | 43.9266 |
| 13 | 48 | 31+A | 1.97863 | 42.9154 |
| 14 | 43.5 | 15+A | 1.88236 | 41.8906 |
| 15 | 39 | 0+A | 1.79094 | 41.1469 |
|  | Count reference | 0 | ---- | ---- |
|  | Collapsed | -B | ---- | ---- |

ROTARY MOTION DETECTOR

This application is a continuation of application Ser. No. 08/361,368, filed Dec. 22, 1994, now abandoned.

BACKGROUND OF THE INVENTION

1. Field of the Invention

The present invention relates to an apparatus to detect rotary motion, and in particular, relates to a rotary motion detector for a vibration compensation device which moves a vibration compensation optical system, approximately perpendicular to the optical axis, to prevent image blur which results from camera vibration.

2. Description of the Related Art

An example of a known camera with vibration compensation is shown in Japanese Patent Publication Number HEI 3-87716. The camera described therein comprises a picture taking optical system having a vibration compensation optical system incorporated therein. The vibration compensation optical system uses a drive mechanism to shift the optical axis of the vibration compensation optical system to compensate for vibration to the camera.

However, the vibration compensation optical system does not always move as commanded. Therefore, it is necessary to detect the amount and the direction of movement of the vibration compensation optical system to provide feedback for further movement. With such information, it is possible to correct the position of the vibration compensation optical system for the difference between the actual and desired location. In order to detect the amount and direction of movement, a command member, with a gradiated slit screen, is attached to the vibration compensation optical system. A photodiode element and a CCD image pickup element are positioned on either side of the command member. When the compensation optical system is moved to compensate for vibrations in the camera, the position of the slit screen changes and the amount of light received by the photoreceptor element changes, so the amount and direction of movement of the vibration compensation optical system can be detected. However, it is difficult to accurately detect slight changes in the position of the vibration compensation optical system. Further, a certain amount of time is needed to determine the amount and direction of movement, which makes it difficult to quickly position the vibration compensation optical system to respond to the vibrations in the camera.

SUMMARY OF THE INVENTION

Accordingly, it is an object of the present invention to provide an apparatus which accurately and quickly detects the amount and direction of movement of a vibration compensation optical system.

It is another object of the invention to provide an apparatus which accurately and quickly detects the amount and direction of movement of a vibration compensation optical system using a pair of optical detection elements which output pulse signals corresponding to the amount of rotation and the rotation direction of a motor which activates the compensation signal.

It is a further object of the present invention to provide an apparatus which accurately and quickly detects the amount and direction of movement of a vibration compensation optical system using a pair of optical detection elements which output pulse signals, corresponding to the amount of rotation and the rotation direction of a motor which activates the compensation signal, in phases which are shifted with respect to each other.

It is another object of the present invention to provide a rotary motion detector able to output a signal indicative of the amount and direction of rotation.

It is yet another object of the present invention to provide a method to detect the amount and direction of rotary movement of a rotating shaft.

Additional objects and advantages of the invention will be set forth in part in the description which follows, and, in part, will be obvious from the description, or may be learned by practice of the invention.

The foregoing objects of the present invention are achieved in a camera comprising a vibration compensation optical system to compensate for the image blur which results from camera vibration, a first and second motor having output shafts for driving the vibration compensation optical system, a first and second reduction gear train to reduce the speed of rotation of the output shafts of the first and second motor respectively, a first and second shift member which move the vibration compensation optical system in a specified direction through the rotation of the reduction gear train, and a detection unit which detects a physical quantity relating to the amount of movement of the vibration compensation optical system, a first and second optical detection elements that output pulse signals according to the amount of rotation of the output shafts of the aforementioned motors, the first and second optical detection element outputting pulse signals in phases which are shifted with respect to each other according to the rotation direction of the output shafts of the aforementioned motors.

The foregoing objects of the present invention are also achieved in a rotary motion detector comprising an indicator coupled with the rotary motion, the indicator providing a discrete indication for every unit of movement, and a pick-up element to transmit a signal which varies when the discrete indication is provided by the indicator, the pick-up element transmitting a different signal pattern depending on the direction of the rotary motion.

Objects of the present invention are also achieved by a vibration compensation device for a camera comprising a compensation lens, an x-axis driver for moving the compensation lens in an x-axis direction, a y-axis driver for moving the compensation lens in a y-axis direction, an x-axis indicator coupled with the x-axis driver, the x-axis indicator providing a discrete indication for every unit of movement of the compensation lens in the x-axis direction, a y-axis indicator coupled with the y-axis driver, the y-axis indicator providing a discrete indication for every unit of movement of the compensation lens in the y-axis direction, an x-axis pick-up element to transmit a signal which changes when the discrete indicator is provided by the x-axis indicator, the x-axis pick-up element transmitting a different signal depending on the direction of the rotary motion, a y-axis pick-up element to transmit a signal which changes when the discrete indication is provided by the y-axis indicator, the x-axis pick-up element transmitting a signal having a different phase, depending on the direction of the rotary motion, and a control unit to control the x-axis driver and the y-axis driver in response to vibrations in the camera and the signals from the x-axis pick-up element and the y-axis pick-up element.

The foregoing objects of the present invention are further achieved in a method of detecting rotary motion comprising outputting a first pulse signal based on the motion of an indicator coupled to the rotary motion, the motion of the indicator being detected at a first location, outputting a second pulse signal based on the motion of the indicator as detected at a second location, and determining the direction of rotary motion by comparing the first pulse signal with the second pulse signal.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
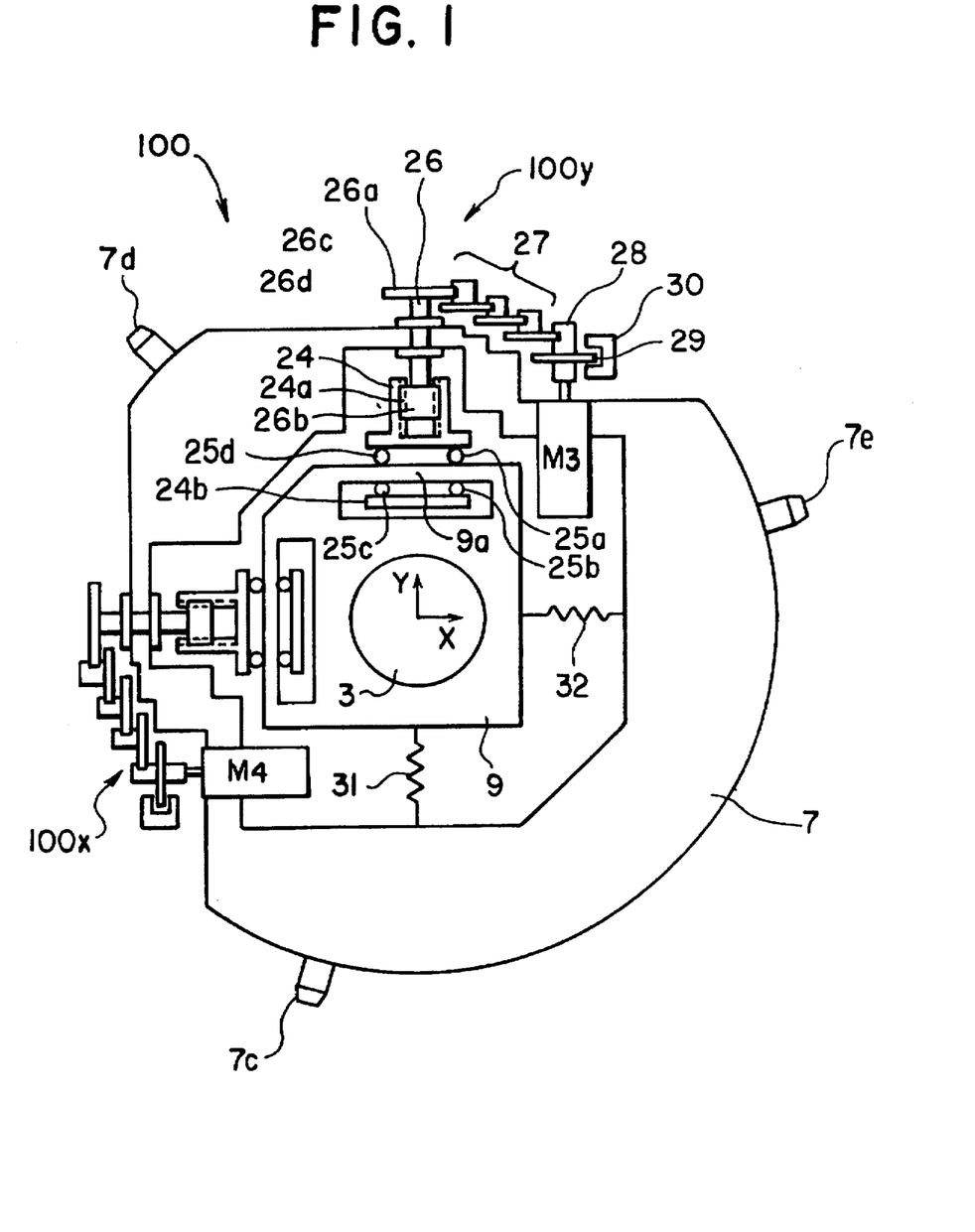
FIG. 1 is a cross-sectional view, taken along line I—I in FIG. 2, showing a vibration compensation system in accordance with the preferred embodiment of the present invention.
Figure 2:
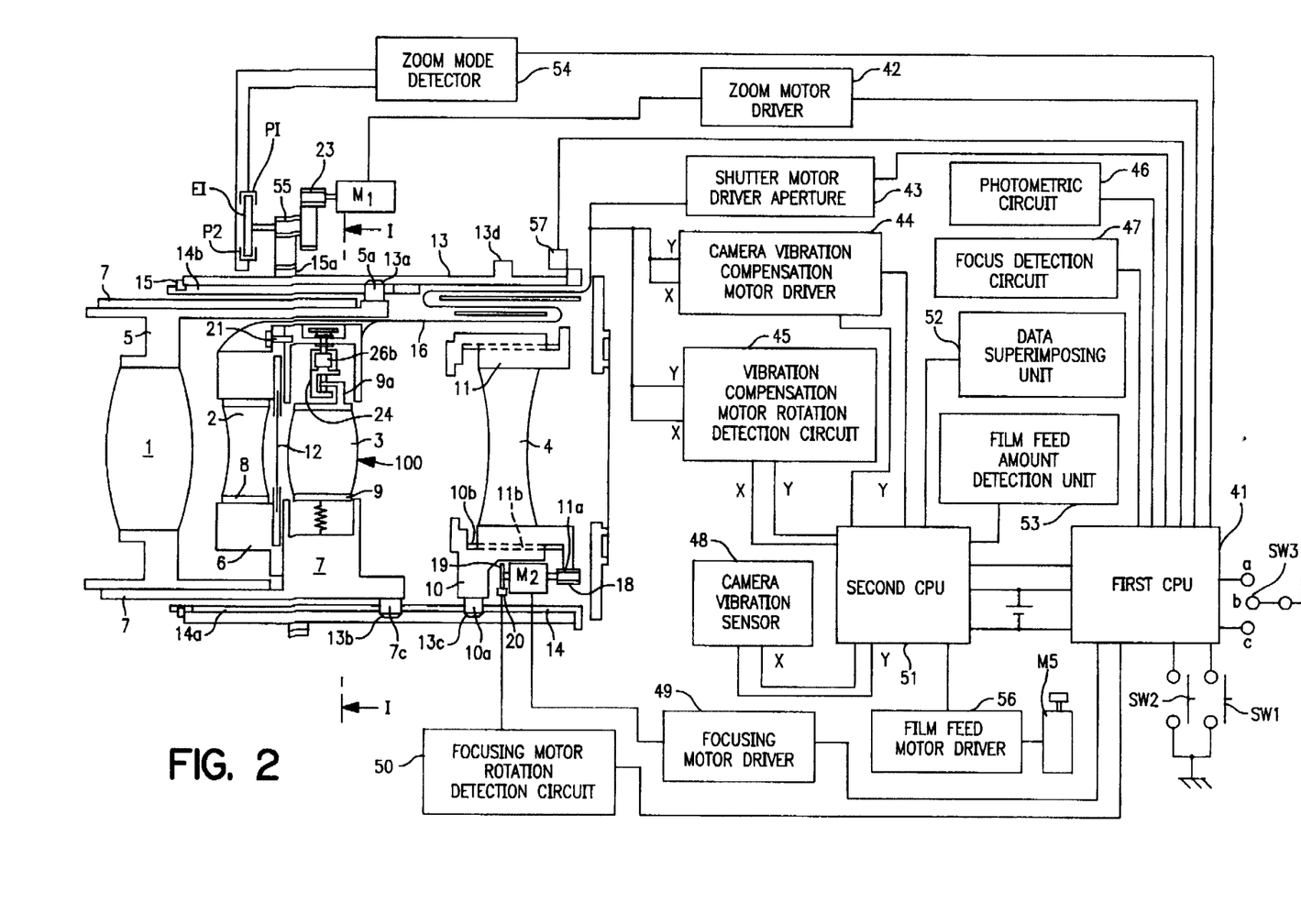
FIG. 2 is a block diagram showing a vibration compensation system for a camera in accordance with the preferred embodiment of the present invention.

FIG. 1 is a cross-sectional view of a vibration compensation mechanism for use in a camera having a fixed lens barrel 14 (see FIG. 2). A lens base 7, designed to be supported inside the front end of a fixed lens barrel 14, supports a vibration compensation system 100. The vibration compensation system 100 generally comprises a compensation lens 3 supported by a lens holder 9, an x-axis drive mechanism 100x, for driving the compensation lens 3 in the x-axis direction, and a y-axis drive mechanism 100y, for driving the compensation lens 3 in the y-axis direction. As used herein, the x-axis and y-axis directions are perpendicular to the optical axis of the picture taking lens 1 (see FIG. 2).

The y-axis drive mechanism 100y comprises a y-axis motor M3 having an output shaft, a gear 28 which rotates in unison with the output shaft, a reduction gear train 27 to provide rotation having a speed less than that of the gear 28, a y-axis shift drive shaft 26 linked to the gear train 27, and a y-axis drive arm 24 which converts the rotation of the drive shaft 26 to rectilinear motion. The y-axis shift drive shaft 26 is rotatably secured to the base 7 by a pair of flanges 26c and 26d. The y-axis drive shaft 26 has a gear 26a on one end and a male screw 26b on the other end. The gear 26a meshes with the last gear of the reduction gear train 27. The y-axis drive arm 24 is provided with a female screw 24a, and is held, in a space formed in the base 7, such that it can move along the y-axis. However, the y-axis drive arm is rotationally fixed in place. The male screw 26b of the drive shaft 26 is threadably engaged with the female screw 24a of the y-axis drive arm 24 so as to linearly move the y-axis drive arm 24 when rotated.

An enclosure section 24b, formed at the lower end of the drive arm 24, encloses an upper link section 9a of the lens holder 9. The enclosure section 24b movably secures the link section 9a via four slider balls 25a, 25b, 25c, 25d. Linear movement of the y-axis drive arm 24, moves the lens holder 9, and therefore the compensation lens 3, in the y-axis direction. The amount of linear movement of the y-axis drive arm 24 depends on the amount of rotation of the motor M3. An indicator disk 29, attached to the gear 28, rotates in unison with the output shaft of y-axis motor M3. The rotation of the indicator disk 29 is detected by a pick-up unit 30.

The x-axis drive mechanism 100x has the same configuration as the y-axis drive mechanism 100y, and drives the compensation lens 3 in the x-axis direction by way of an x-axis motor M4. As the y-axis drive mechanism 100y and the x-axis drive mechanism 100x are each linked with the lens holder 9 by means of slider balls, the compensation lens 3 can be moved in any direction perpendicular to the optical axis. A pair of springs 31 and 32 bias the lens holder 9 toward the y-axis drive mechanism 100y and the x-axis drive mechanism 100x, respectively. Three cam followers 7c, 7d, and 7e are provided to assist in moving the base 7 along the optical axis of the fixed lens barrel 14, as will be described hereinafter.

FIG. 2 is a block diagram of a camera equipped with a vibration compensation system in accordance with the preferred embodiment of the present invention. Several lens groups 1–4 form a picture taking optical system. The lens groups 2 and 3 are movable, in unison, along the optical axis to achieve focus. The lens group 3 is also movable perpendicular to the optical axis as described above.

A pair of linear grooves 14a and 14b are formed parallel to the optical axis on the outer circumference of the fixed lens barrel 14. A rotatable cam tube 13 surrounds the fixed lens barrel 14 and is sealed by a ring 15. A zooming motor M1 rotates the cam tube 13 via gears 55 and 23 which mesh with a gear section 15a on the cam tube 13. Three cam grooves 13a, 13b and 13c, and a convex section 13d for detecting the lens barrel reset position, are formed on the outer surface of the cam tube 13. When the cam tube 13 has reached a reset position, the convex section 13d turns a lens barrel reset switch 57 ON, and a signal to that effect is transmitted to a first CPU 41. The cam follower 7c, embedded in the base 7, passes through the linear groove 14a and fits into the cam groove 13b.

A shutter mechanism is provided comprising a shutter blade 12, which also serves as the aperture. A shutter driver 6, attached to the base 7 by a machine screw 21, drives the shutter blade 12. The lens group 2 is attached to the shutter driver 6 by a lens holder 8.

A lens holder 5, inserted through the front end of the base 7, holds the picture taking lens 1. A cam follower 5a, embedded in the lens holder 5, passes through the linear groove 14b and fits into the cam groove 13a. A lens base 10, for supporting the lens group 4, is provided with a helicoid 10b on the inner surface and a cam follower 10a on its outer surface. The cam follower 10a passes through the linear groove 14a and fits into the cam groove 13c.

A lens holder 11 holds the focusing lens 4. A helicoid 11b on the outer surface of the lens holder 11 is screwed into the helicoid 10b of the lens base 10. The lens holder 11 is also provided with a gear 11a which meshes with a gear 18 on an output shaft of a focusing motor M2, positioned on the lens holder 11. A photointerrupter 20 is provided to detect the amount of rotation of the focusing motor M2 via an indicator disk 19 to obtain the position of the focusing lens 4.

The zooming motor M1 and the focusing motor M2 are connected to the first CPU 41 through a zoom motor driver 42 and a focusing motor driver 49, respectively. The amount of film feed is detected by a film feed detection unit 53 connected to a second CPU 51. A data superimposing unit 52, connected to the second CPU 51, is provided to superimpose data, for example date and time, onto the film. The first CPU 41 is also connected to a focusing motor rotation detection circuit 50 for determining the amount of rotation of the focusing motor M2 by detecting the amount of rotation of the focusing lens 4 from the output of the photointerrupter 20.

A photometric circuit 46 detects the subject brightness and transmits the results to the first CPU 41. Further, a focus detection circuit 47 is connected to the first CPU 41 to provide data concerning focus adjustment. The first CPU 41 is also connected to a half-press switch SW1, which turns ON with a half press of a shutter release button (not shown in the diagram) halfway, a full-press switch SW2, which turns ON with a full press of the shutter release button fully, and a zoom switch SW3, which controls zooming of the lens group 1. A zoom mode detector 54 transmits a signal to the first CPU 41 indicative of the amount of zooming based on the output of detectors P1 and P2 which in turn is based on the rotation of indicator disk 51.

A flexible printed circuit board 16 connects the y-axis motor M3 and the x-axis motor M4, which drive the compensation lens 3, to a camera vibration compensation motor driver 44. The camera shake compensation motor driver 44 is connected to a second CPU 51. The second CPU 51 is also connected to a camera vibration sensor 48 comprising, for example, angular velocity sensors, which detect the amount of camera vibration on the x-axis and the y-axis. A vibration compensation motor rotation detection circuit 45 detects the amount of rotation of the y-axis motor M3 and the x-axis motor M4 from the output of the respective pickup units 30 and transmits the results to the second CPU 51. A film feed motor driver 56, is provided to control a film feed motor M5 for advancing and rewinding the film in response to signals from the second CPU 51.

Figure 3:
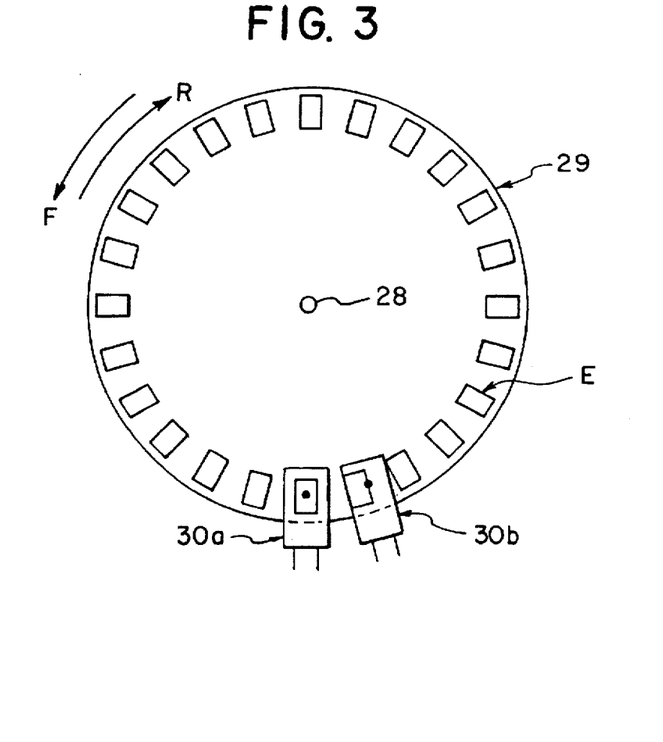
FIG. 3 is a diagram showing the arrangement of photointerrupters in accordance with the preferred embodiment of the present invention.

FIG. 3 is a diagram showing the configuration of the indicator disk 29 and a pair of photointerrupters 30a and 30b which comprise each of the pick-up units 30. The indicator disk 29 has multiple holes E formed concentrically around its periphery. A pair of rectangular shaped photointerrupters 30a and 30b are positioned over the holes E. A photoemitter, serving as a light source, and a photoreceptor (not shown), serving as an optical detection element, are situated, on opposite sides of the indicator disk 29, under the center sections of each of the photointerrupters 30a and 30b. The photointerrupters 30a and 30b are arranged so that they are separated by a distance equal to ¾ of a gap between two adjacent holes E (the gap being equal to a distance "L"). When the holes E pass under the center section of the photointerrupters 30a and 30b, low-level pulse signals are output from the photoreceptors.

Because photointerrupters 30a and 30b are separated by a distance equal to L×¾, when the indicator disk 29 is rotated in the clockwise (in the R direction), a pulse signal is output from the photointerrupter 30b having a phase that is slower by a ¼ cycle than that of photointerrupter 30a. Conversely, when the indicator disk 29 is rotated counterclockwise (in the F direction), a pulse signal is output from the photointerrupter 30b having a phase that is faster by a ¼ cycle than that of photointerrupter 30a.

Therefore, the direction of movement of the compensation lens 3 can be determined from the differences in the phases output from the respective photointerrupters 30a and 30b, which depend on the direction of rotation of the disk 29. Because the photointerrupters 30a, 30b output pulse signals when passing through the holes E of disk 29, the amount of rotation of the disk 29, and therefore the amount of movement of the compensation lens 3, can be determined by simply counting the number of the pulse signals.

The same configuration, comprising a disk 29 and a pair of photointerrupters 30a and 30b, is positioned around the output shaft of the x-axis motor M4. Thus, the amount of rotation and the rotation direction of the x-axis motor M4 can be detected.

Figure 4:
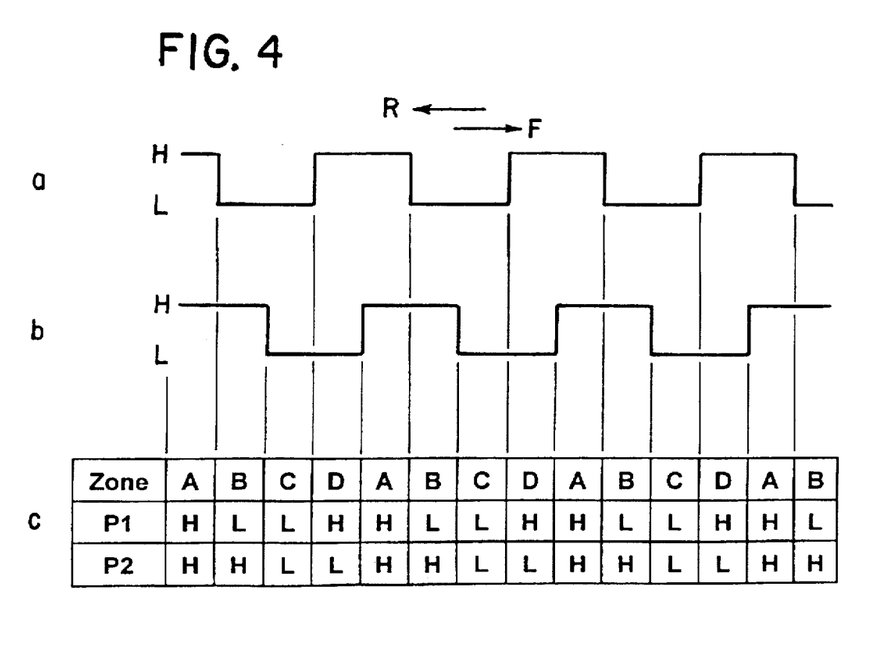
FIG. 4 is a diagram showing the output of the photointerrupters in accordance with the preferred embodiment of the present invention.

FIG. 4 is a diagram showing the output of the photointerrupters 30a and 30b. When the indicator disks 29 on the x-axis and y-axis motors M3 and M4 are rotated clockwise, the output of the photointerrupter 30a is shown by the waveform a, and the output of the photointerrupter 30b is indicated by the waveform b. If a high-level output is expressed as "H," and a low-level output is expressed by "L", there are four types of output combinations, i.e. A, B, C and D, as shown in table c. When the disk 29 is rotated in a clockwise direction, a pattern of output combinations follows the sequence A B C D A. On the other hand, when the disk 29 is rotated counterclockwise, a pattern of output combinations follow in the sequence D C B A D. Thus, the rotation direction of the disk 29 can be detected by detecting differences in the output patterns.

Figure 5:
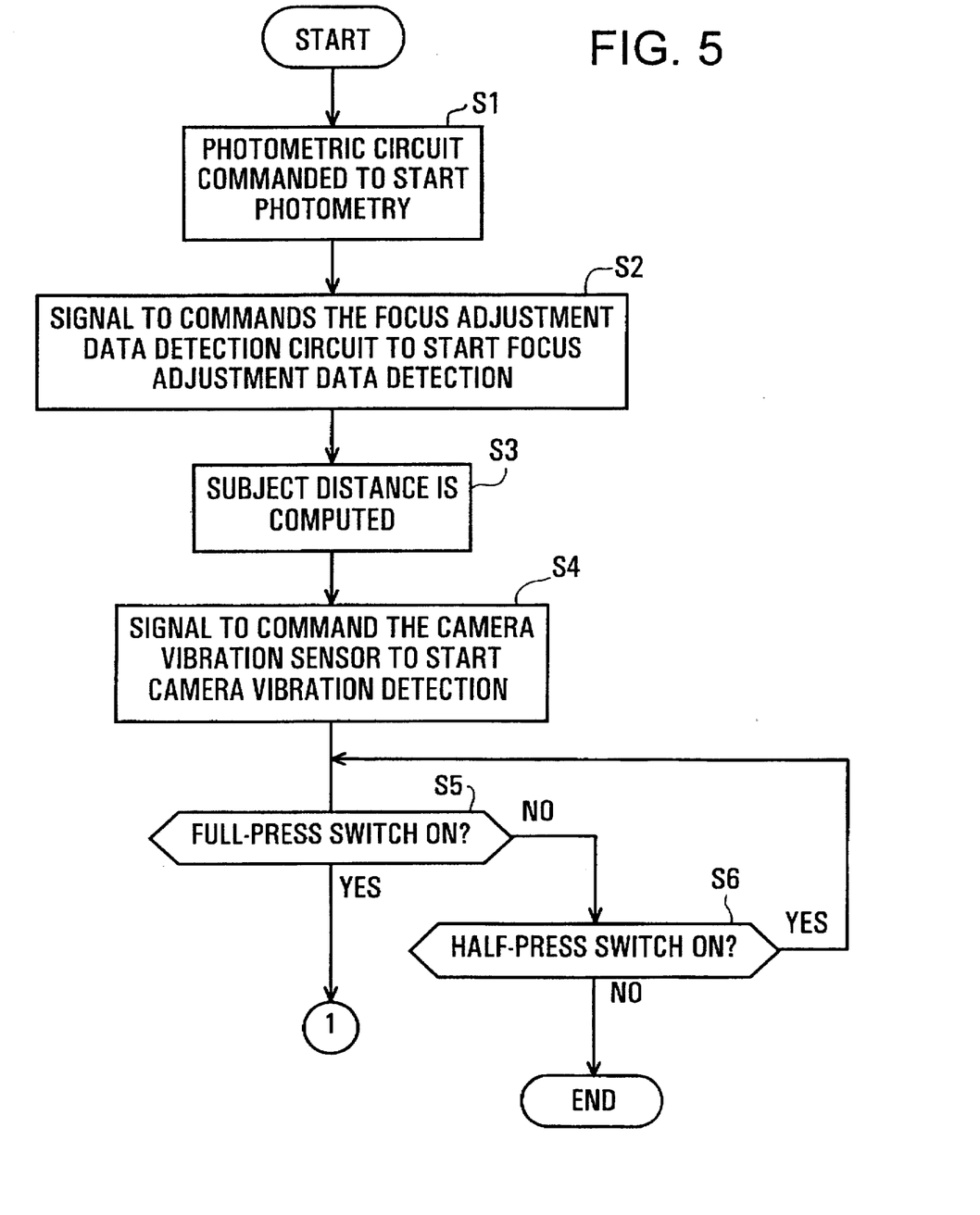
FIG. 5 is a flow chart showing the operation of a vibration compensation system for a camera in accordance with the preferred embodiment of the present invention.

FIG. 5 is a flow chart which shows the operation sequence of the first CPU 41 and the second CPU 51. When the shutter release button is pressed halfway, the first CPU 41 starts the processing at step S1. In step S1, the first CPU 41 sends out a signal which commands the photometric circuit 46 to perform photometry. The photometric results from the photometric circuit 46 are sent to the first CPU 41, and the aperture setting and shutter speed are determined. In step S2, the first CPU 41 sends out a signal which commands the focus detection circuit 47 to detect focus. In step S3, the first CPU 41 computes the subject distance based on the measurement results from the focus detection circuit 47. In step S4, the second CPU 51 sends out a signal which commands a camera vibration sensor 48 to begin vibration detection. In step S5, the first CPU 41 determines whether the full-press switch SW2 is ON. When the full-press switch SW2 is OFF, operation proceeds and a determination is made in step S6 as to whether the half-press switch SW1 is ON. If the half-press switch SW1 is OFF, processing is ended, otherwise the process returns to step S5.

Figure 6:
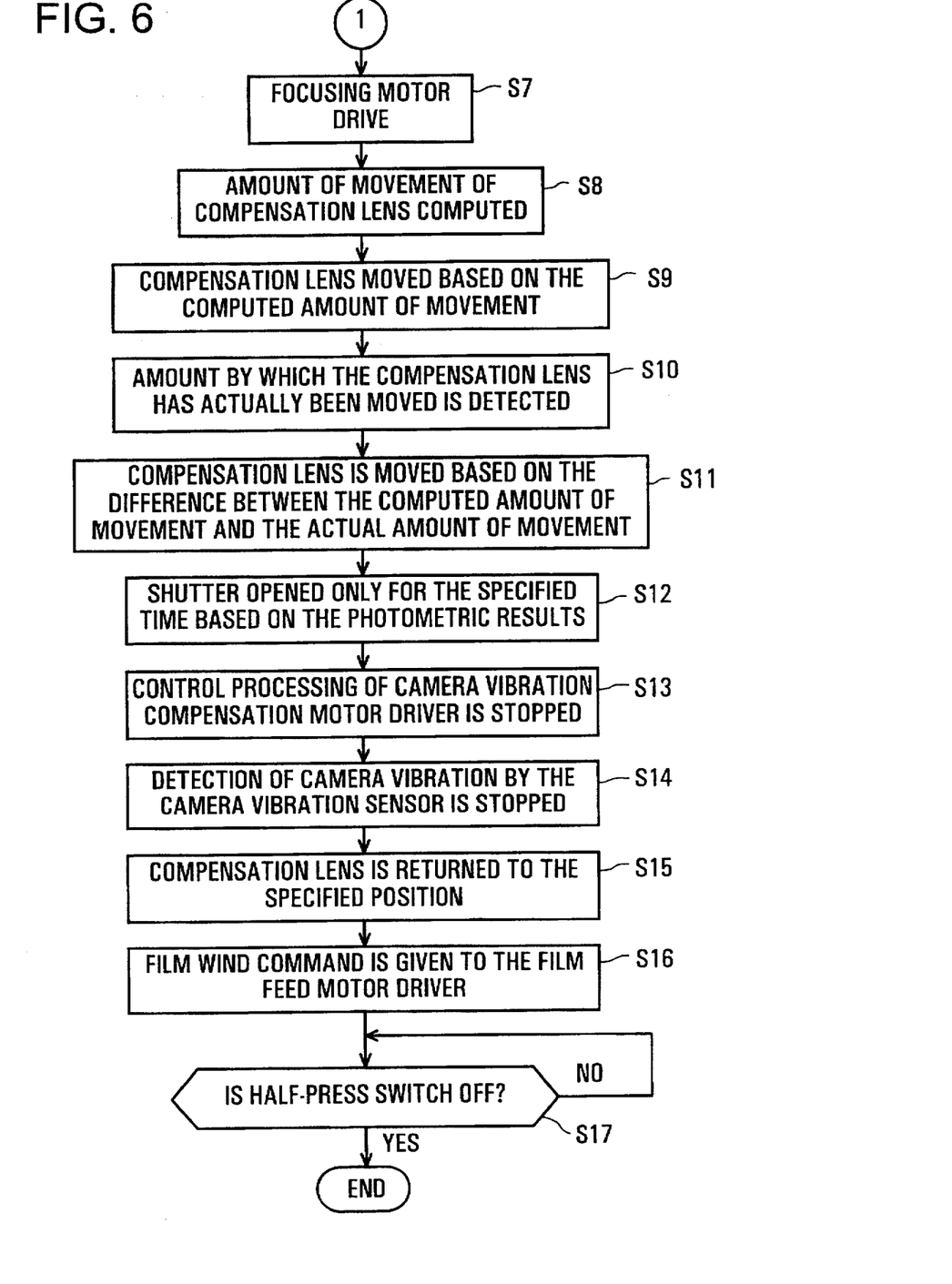
FIG. 6 is a flow chart showing the operation of a vibration compensation system for a camera in accordance with the preferred embodiment of the present invention.

When the full-press switch is ON, operation proceeds to step S7 (see FIG. 6 which is a continuation of FIG. 5). In step S7 the first CPU 41 drives the focusing motor M2 via the focusing motor driver 49 to achieve focus. In general, the gear 18 rotates the lens holder 11 by causing the lens holder 11 to move along the optical axis by the action of the helicoids 10b and 11b.

In step S8, the second CPU 51 computes the amount of movement L of the compensation lens 3 based on the subject distance computed in step S3 and the amount of camera vibration detected by the camera vibration sensor 48. The amount of movement "L" in millimeters of the compensation lens 3 is determined by the following equation when the camera vibration angle Θ(rad), as detected by the camera vibration sensor 48, the subject distance R (m), and the zoom zone coefficients d1 and d2, obtained from the focal length of the focusing lens 4, are known.

Equation 1 $L = \{d1 \times (1/R) + d2\} \times \Theta$  (1)

The zoom coefficients d1 and d2 change according to the focal length of the focusing lens 4.

Figure 7:
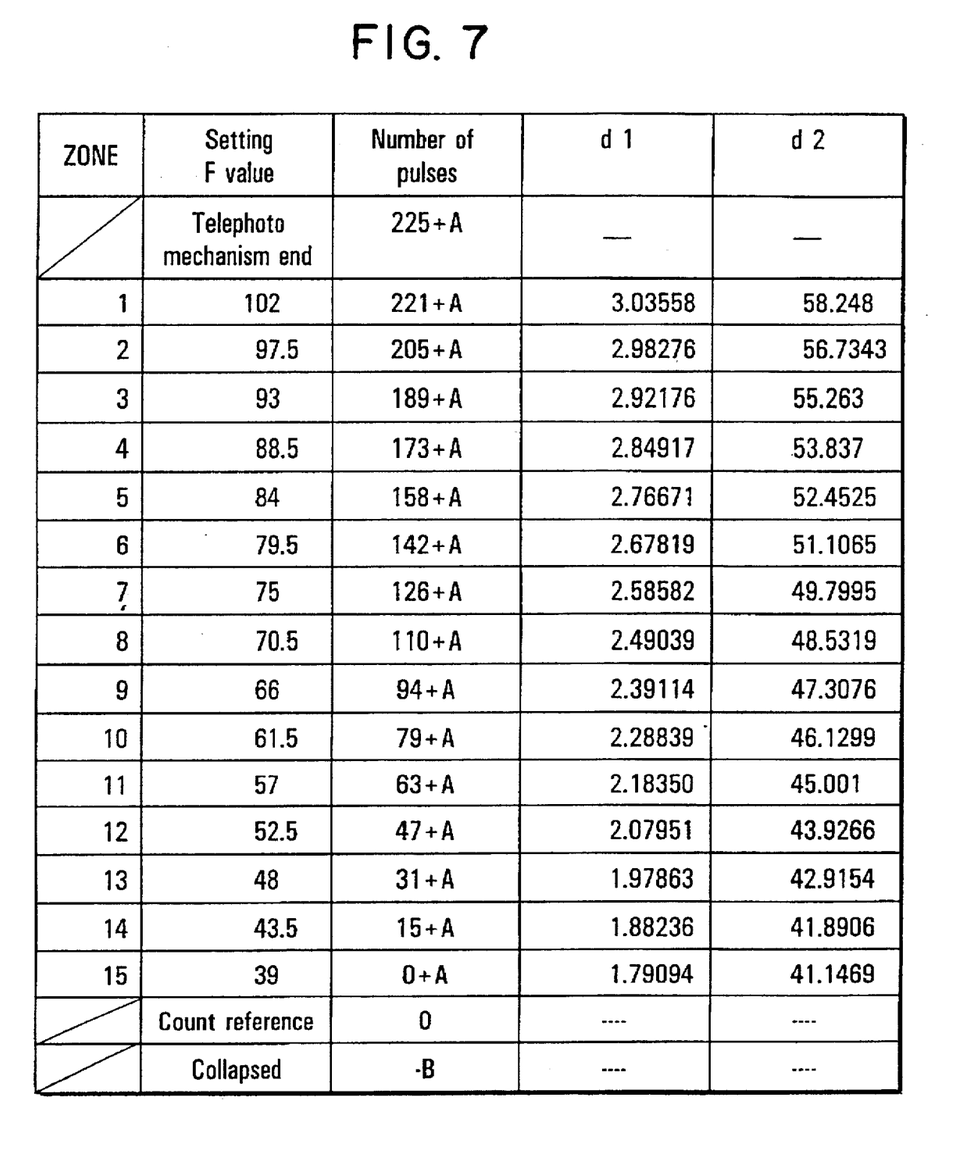
FIG. 7 is a table showing the relationship between the focal length of the focusing lens and the zoom zone coefficient of the focusing lens.

FIG. 7 is a table showing the relationship between the zoom coefficients and the focal length of the focusing lens 4. These relationships are preferably stored in a ROM (not shown). The second CPU 51 reads coefficients d1 and d2 from the ROM corresponding to the appropriate focal lengths, and computes the amount of movement L of the compensation lens 3 based on Equation (1). As used in FIG. 7, the term "number of pulses" refers to the number of pulses output by the photointerrupters 30a and 30b until the focusing lens 4 is moved to the corresponding focal length, and the "A" and the "B" are error adjustment values.

Referring once again to FIG. 6 in step S9, the second CPU 51 moves the compensation lens 3 based on the amount of movement of the compensation lens 3 computed in step S8. That is, the second CPU 51 sends a signal to the camera vibration compensation motor driver 44 to drive the x-axis and y-axis motors M3 and M4, thereby moving the compensation lens 3 in the x-axis and y-axis directions. In step S10, the second CPU 51 reads the output of photointerrupters 30a and 30b from the vibration compensation motor rotation detection circuit 45, and determines the amount which the compensation lens 3 has actually moved. In step S11, the second CPU 51 computes the difference between the amount of movement of the compensation lens 3 computed in step S8 and the amount by which the compensation lens 3 actually moved. Further, the amount of camera vibration is again detected by the camera vibration sensor 48. The compensation lens 3 is then moved to compensate for vibrations and errors in movement. Steps S10 and S11 are repeated until the shutter closes in step S12.

In step S12, the first CPU 41 controls the shutter driver 6 and, based on the photometric results, opens the shutter for a specified period of time. When the specified period of time has elapsed, the second CPU 51 closes the shutter. Thereafter, in step S13, the control processing of the camera vibration compensation motor driver 44, as set forth in steps S10 and S11, is stopped. In step S14, the second CPU 51 stops camera vibration detection by the camera vibration sensor 48. In step S15, the second CPU 51 returns the compensation lens 3 to a specified reference position (for example, a position at which the optical axis of the compensation lens 3 coincides with the optical axes of lens groups 1–4). In step S16, the second CPU 51 gives a command to the film feed motor driver 56 to wind, one frame of the film. At the same time, data such as the date may be superimposed onto the surface of the film by the data superimposing unit 52. In step S17, the first CPU 41 determines whether the half-press switch SW1 is OFF. Once the half-press switch SW1 is released, processing is ended.

Although a few preferred embodiments of the present invention have been shown and described, it would be appreciated by those skilled in the art that changes may be made in these embodiments without departing from the principles and spirit of the invention, the scope of which is defined in the claims and their equivalents.

For example, although photointerrupters were used as optical detection elements, one skilled in the art will recognize that photoreflectors, for example, may be used instead. Also, while the amount of rotation of the output shafts of motors M3 and M4 is directly detected, the amount of rotation of any gear of the gears in the reduction gear train 27 may instead be detected. Moreover, the mechanism for converting the rotational motion of motors M3 and M4 to rectilinear motion and shifting the compensation lens 3 is not limited to the aforementioned embodiment. Further, focusing and vibration compensation processing may be performed during the half press as opposed to during full press as described herein.

What is claimed is:

1. A rotary motion detector for detecting movement of a lens coupled with a vibration compensation device which detects and compensates for vibrations using the lens, the rotary motion detector comprising:

an indicator coupled with the rotary motion, said indicator providing a discrete indication for every unit of movement; and a pick-up element to transmit a signal which varies when the discrete indication is provided by said indicator, said pick-up element transmitting a different signal pattern depending on the direction of the rotary motion.

2. A rotary motion detector, as set forth in claim 1, wherein said pick-up element transmits a signal having a first phase when the rotary motion is in a first direction and transmits a signal having a second phase when the rotary motion is in a second direction.

3. A rotary motion detector, as set forth in claim 1, wherein said indicator is a disk having a periphery provided with a plurality of holes.

4. A rotary motion detector, as set forth in claim 3, wherein said pick-up element comprises:

a first and second optical detection element spaced from the periphery of said disk, said first optical detection element being spaced from said second optical detection element by a distance different than the distance between adjacent holes in said disk; and a first and second light source positioned on the opposite side of said disk corresponding to said first and second optical detection elements.

5. A rotary motion detector, as set forth in claim 4, wherein the distance between said first optical detection element and said second optical detection element is approximately ¾ of the distance between adjacent holes in said disk.

6. A rotary motion detector, as set forth in claim 4, wherein said first optical and said second optical detection elements are photointerrupters.

* * * * *